United States Patent [19]

Bezborodov et al.

[11] Patent Number: 4,605,520
[45] Date of Patent: Aug. 12, 1986

[54] LIQUID CRYSTAL 4-(4'-CYANODIPHENYL) ESTERS OF TRANS-4''-N-ALKYLOCYCLOHEX-2-ENECARBOXYLIC ACIDS

[75] Inventors: Vladimir S. Bezborodov; Viktor A. Konovalov; Jury L. Ptashnikov, all of Minsk, U.S.S.R.

[73] Assignee: Nauchno-Issledovatelsky Institut Prikladnykh Fizicheskikh Problem Imeni A.N. Sevchenko, Minsk, U.S.S.R.

[21] Appl. No.: 694,684

[22] Filed: Jan. 25, 1985

[51] Int. Cl.⁴ .................. G02F 1/13; C09K 3/34; C07C 121/48; C07C 121/60

[52] U.S. Cl. .................. 558/414; 252/299.6; 252/299.63; 252/299.65; 252/299.66; 350/350 R

[58] Field of Search ............. 260/465 D; 252/299.6, 252/299.63, 299.65, 299.66; 350/350 R

[56] References Cited

U.S. PATENT DOCUMENTS

| | | | |
|---|---|---|---|
| 3,951,846 | 4/1976 | Gavrilovic | 252/299.65 |
| 4,013,582 | 3/1977 | Gavrilovic | 252/299.63 |
| 4,029,594 | 6/1977 | Gavrilovic et al. | 252/299.65 |
| 4,113,647 | 9/1978 | Coates et al. | 252/299.63 |
| 4,207,252 | 6/1980 | Sato et al. | 252/299.6 |
| 4,211,666 | 7/1980 | Inufai et al. | 252/299.6 |
| 4,261,651 | 4/1981 | Gray et al. | 252/299.63 |
| 4,261,652 | 4/1981 | Gray et al. | 252/299.62 |
| 4,505,837 | 3/1985 | Romer et al. | 252/299.63 |

FOREIGN PATENT DOCUMENTS 2078727  1/1982  United Kingdom ............ 252/299.6

OTHER PUBLICATIONS

Gray, G. W., et al., Mol. Cryst. Liq. Cryst., vol. 53, pp. 147-166, (1979).

Primary Examiner—Teddy S. Gron
Attorney, Agent, or Firm—Burgess, Ryan & Wayne

[57] ABSTRACT

Liquid crystal 4-(4'-cyanodiphenyl) esters of trans-4''-n-alkylcyclohex-2-enecarboxylic acids of the general formula:

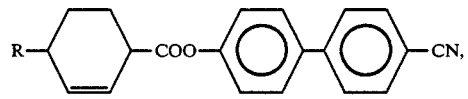

wherein R is a $CH_3$—$C_7H_{15}$ radical of a normal structure. These compounds have low temperatures of the formation of the liquid crystal phase (42°-50° C.), a small heat of transition from the crystal phase into the liquid crystal phase ($\Delta H = 2.7-3.2$ kCal/mol), a wide range of the existence of the liquid crystal phase (140° C.).

1 Claim, No Drawings

LIQUID CRYSTAL 4-(4'-CYANODIPHENYL) ESTERS OF TRANS-4''-N-ALKYLOCYCLOHEX-2-ENECARBOXYLIC ACIDS

FIELD OF THE INVENTION

The present invention relates to novel liquid crystal compounds which can be useful as components of mesomorphic compositions for electro-optical devices for presentation of information (electronic watch, microcalculators, display boards and the like).

BACKGROUND OF THE INVENTION

Known in the art are liquid crystal 4-(trans-4''-n-alkylcyclohexylmethoxy)-4'-cyanodiphenyls (cf. Mol. Cryst.Liq.Cryst. vol. 53, 1979, Gordon & Breach Science Publishers, Ltd., London, G. W. Gray, D. G. McDonnel "liquid Crystal Compounds Incorporating the Trans-1,4-Substituted Cyclohexene Ring System", p. 155).

These compounds have a disadvantage residing in a high temperature of the formation of a mesomorphic (nematic) phase (not less than 93° C.), a high heat of the transition from the liquid phase into the liquid-crystal one (ΔH not less than 4.8 kcal/mol) which limits their use as components of liquid crystal compositions possessing low temperatures of liquid-crystal phase formation. Thus, a composition consisting of 14% by weight of 4-(trans-4''-n-butylcyclohexylmethoxy)-4'-cyanodiphenyl and 86% by weight of 4-n-pentyl-4'-cyanodiphenyl has a sufficiently high temperature of the liquid-crystal phase formation equal to 11° C. and features a narrow temperature range of the existence of the liquid-crystal phase (47° C.) (see the same publ., p.158).

Another analog of the compounds according to the present invention is exemplified by 4-(4'-cyanodiphenyl) esters of trans-4''-n-alkylcyclohexanecarboxylic acids. The temperature of formation of the liquid-crystal phase of these compounds is not below 79.8° C. (cf. opt, cit.publ., p.153). These compounds feature the same disadvantages as 4-(trans-4''-n-alkylcyclohexylmethoxy)-4'-cyanodiphenyls.

SUMMARY OF THE INVENTION

It is an object of the present invention to provide novel liquid crystal compounds with a low temperature of the formation of the liquid crystal phase.

It is another object of the present invention to provide liquid crystal compounds possessing a wide range of existence of the liquid crystal phase.

It is still another object of the present invention to provide liquid crystal compounds characterized by a low value of the heat of transition from the crystal phase into the liquid crystal one.

It is a further object of the present invention to provide liquid crystal compounds which can be useful as components of a liquid crystal composition characterized by a low temperature of the formation of a liquid crystal phase, a wide temperature range of existence of this phase and intended for electrooptical devices for presentation of information.

These and other objects of the present invention are accomplished by novel liquid crystal compounds—4-(4'-cyanodiphenyl) esters of trans-4''-n-alkylcyclohex-2-enecarboxylic acids of the general formula:

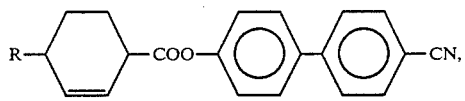

wherein R is a $CH_3$—$C_7H_{15}$ hydrocarbon radical of a normal structure.

The compounds according to the present invention have low temperatures of the formation of the liquid crystal (nematic) phase (42°–50° C.), a low value of the heat of transition from the crystal phase into the liquid crystal one (ΔH = 2.7 − 3.2 kcal/mol), a wide temperature range of the existence of the liquid crystal phase (140° C.).

This enables a successful use of the liquid crystal compounds according to the present invention as components of a liquid crystal composition intended for electrooptical devices for presentation of information.

DETAILED DESCRIPTION OF THE INVENTION

The liquid crystal compounds according to the present invention are produced by a known reaction, namely by interacting trans-4-n-alkylcyclohex-2-enecarboxylic acid chlorides with 4-hydroxy-4'-cyanodiphenyl in the presence of pyridine. The process for preparing these liquid crystal compounds comprises intermixing a mixture of 0.3 mol of trans-4-n-alkylcyclohex-2-enecarboxylic acid (wherein the alkyl is a $CH_3$—$C_7H_{15}$ normal radical), 0.4 mol of thionyl chloride, 0.5 mol of pyridine in anhydrous diethyl ether for 1.5 hours. Then the mixture is added with 0.3 mol of 4-hydroxy-4'-cyanodiphenyl and 0.5 mol of pyridine. The mixture is allowed to stand for about 12 hours at room temperature. Thereafter, the ethereal solution of the desired product is washed with water and dried with anhydrous sodium sulphate. The residue obtained after distilling-off the solvent is recrystallized from a mixture of methanol and benzene. The yield of the desired product is 50–60% as calculated for the amount of the acid employed.

The synthesized compounds comprise, at room temperature, white odorless substances.

The gross formulae of the resulting compounds have been verified by the results of elemental analysis (see the Table hereinbelow), as well as by the data of IR and PMR spectroscopy.

Intensive absorption bands of 1,725 $cm^{-1}$ and 2,230 $cm^{-1}$ in IR spectra correspond to stretching vibrations of carbonyl of the ester group and to stretching vibrations of the nitrile group. The signals within the range of 7.83–7.00, 5.7 and 3.17 ppm in PMR spectra belong to protons of the aromatic rings, protons at the double bond and the proton located at the first carbon atom of the cyclohexene ring.

The temperature and heat of phase transitions have been determined by means of a differential scanning calorimeter "Perkin-Elmer DSC-2". The results of the measurements are shown in the Table hereinbelow.

TABLE

| Nos 1 | Compounds of the present invention of the above formula with the meanings of 2 | Temperature range of the existence of the liquid crystal phase, °C. 3 | Heat transition of the crystal to the liquid crystal phase, Δ H, kcal/mol 4 | Found, % | | | Gross formula 8 | Calculated, % | | |
|---|---|---|---|---|---|---|---|---|---|---|
| | | | | C 5 | H 6 | N 7 | | C 9 | H 10 | N 11 |
| 1 | $CH_3$ | 85.5–168.5 | — | 79.5 | 6.1 | 4.3 | $C_{21}H_{19}NO_2$ | 79.5 | 6.0 | 4.4 |
| 2 | $C_2H_5$ | 58–189 | 3.0 | 79.6 | 6.2 | 4.4 | $C_{22}H_{21}NO_2$ | 79.8 | 6.3 | 4.2 |
| 3 | $n\text{-}C_3H_7$ | 59–203 | 3.3 | 80.1 | 6.7 | 4.0 | $C_{23}H_{23}NO_2$ | 80.0 | 6.6 | 4.0 |
| 4 | $n\text{-}C_4H_9$ | 42.5–197 | 2.7 | 80.2 | 7.1 | 4.0 | $C_{24}H_{25}NO_2$ | 80.2 | 7.0 | 3.9 |
| 5 | $n\text{-}C_5H_{11}$ | 48.5–189 | 3.2 | 80.5 | 7.4 | 3.9 | $C_{25}H_{27}NO_2$ | 80.4 | 7.2 | 3.8 |
| 6 | $n\text{-}C_6H_{13}$ | 44–186 | — | 80.7 | 7.7 | 3.7 | $C_{26}H_{29}NO_2$ | 80.6 | 7.5 | 3.6 |
| 7 | $n\text{-}C_7H_{15}$ | 65–185 | 3.3 | 80.9 | 7.7 | 3.6 | $C_{27}H_{31}NO_2$ | 80.8 | 7.7 | 3.5 |

As it follows from the above Table, the compounds according to the present invention have low temperatures of the formation of the liquid crystal phase (for example, 42.5°C.), a broad range of the existence of the liquid crystal phase (140° C.), a low value of the heat of transition from the crystal phase into the liquid crystal phase (for example, 2.7 kcal/mol).

The liquid crystal 4-(4'-cyanodiphenyl) esters of trans-4''-n-alkylcyclohex-2-enecarboxylic acids possessing the above-mentioned properties can be successfully employed for the preparation of a liquid crystal composition featuring a low temperature of the formation of the liquid crystal phase, a wide temperature range of the existence of this phase, a short time of switching-on and -off, a low threshold voltage and intended for electro-optical devices for presentation of information.

What is claimed is:
1. Liquid crystal 4-(4'-cyanodiphenyl) esters of trans-4''-n-alkylcyclohex-2-enecarboxylic acids of the general formula:

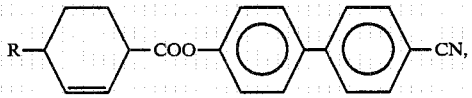

wherein R is a $CH_3$–$C_7H_{15}$ radical of a normal structure.

* * * * *